Patented Mar. 6, 1928.

1,661,601

UNITED STATES PATENT OFFICE.

ARTHUR C. DAHLBERG, OF GENEVA, NEW YORK, ASSIGNOR, BY MESNE ASSIGNMENTS, TO THE PEOPLE OF THE UNITED STATES OF AMERICA.

PROCESS FOR THE MANUFACTURE OF SOFT CHEESE.

No Drawing.   Application filed August 3, 1927.  Serial No. 210,442

(GRANTED UNDER THE PROVISIONS OF THE ACT OF MARCH 3, 1883, 22 STAT. L., 625.)

This application is made under the act of March 3, 1883, chapter 143 (22 Stat. L., 625) and the invention herein described and claimed may be used by the Government of the United States or any of its officers or employees in the prosecution of work for the Government, or by any citizen of the United States, without payment to me of any royalty thereon.

The advantages of my process reside in a saving of time and labor. The cheese is finished and in the refrigerator twelve to twenty-four hours sooner when made by my process. It makes a more uniformly high quality product. The cheese is more smooth and buttery, tastes richer, spreads better, and slices as well or better than cheese made by the Neufchâtel method. Its flavor from the standpoint of acid development and bacterial growth can be controlled to better advantage. The cheese can be packed more solidly in loaves or packages and does not mold as quickly under improper storage conditions. It is never crumbly.

Cream cheese is a soft, fresh cheese with a rich, mild acid flavor, a smooth buttery texture, and a high percentage of milk fat.

The richness of cream cheese should be evident in the characteristics of the cheese when compared with Neufchâtel or cottage cheese. Cream cheese should have a mild acid, distinctly creamy flavor. The acid and salt content should be lower than in cottage cheese. The texture is usually described as very smooth and buttery. It should spread almost as freely as butter. The body should be more rigid than cottage cheese, so that cream cheese can be sold in boxes and packages. It should not be crumbly or too sticky and should pack very solidly. These properties make it possible to cut cream cheese loaves with a wire or string into slices which do not break and have a solid surface.

The materials used in my process and their approximate proportions are as follows:

Sweet cream of good flavor containing 40 to 45 per cent of fat; add 5 per cent of soluble dry skim milk of good flavor; add either 1 per cent of high grade powdered pure food gelatine or 0.5 per cent powdered agar free from objectionable flavor.

My process of treating the above-mentioned cream mixture involves the following steps:

Pasteurization: 145° F. for 30 minutes if gelatine is used, or 180° F. for 10 minutes if agar is used. Cool to 110° F. and add 0.75 per cent common salt and 0.5 to 1.0 per cent good commercial starter. Pass through a coarse strainer into the homogenizer (homogenization pressure of 3500 to 4000 pounds per square inch seems to give best results). Place the cream mixture immediately in the final container and allow to stand in the refrigerator at 32° to 40° F. for one or two hours until the temperature of the cheese is reduced to 70° F. Hold the cheese at 70° F. for 10 to 15 hours or until it has developed sufficient acid to have a mild acid flavor. The cheese is now ready for immediate consumption; store it at 32° to 40° F. At this temperature the cheese has been held two or five weeks without deterioration in flavor.

The process embodies a new principle in soft cream cheese making, namely, the production of a desirable body by clumped fat globules which has been created by homogenization under specified conditions.

Cheese made by my process has a high milk sugar content which may permit higher acid development under warm storage conditions. This, however, tends to reduce mold growth. This cheese has a rich buttery taste due to the high fat content, but lowering the fat percentage increases the whey leakage. The tendency for cheese made by my process to be sticky is offset to a considerable degree by the use of agar.

I claim:

A process for the manufacture of soft cream cheese comprising the mixing of sweet cream, approximately 5 per cent soluble dry skim milk, and approximately one-half of one per cent of powdered agar, Pasteurizing the cream mixture, cooling, adding salt and a commercial starter, straining, homogenizing, and finally reducing the temperature of the cheese to approximately 70° F. and keeping the cheese at this temperature until it has developed a mild acid flavor.

ARTHUR C. DAHLBERG.